United States Patent
Wotherspoon

(10) Patent No.: US 10,733,300 B2
(45) Date of Patent: Aug. 4, 2020

(54) BASIC INPUT/OUTPUT SYSTEM (BIOS)/UNIFIED EXTENSIBLE FIRMWARE INTERFACE (UEFI) HARD DRIVE AUTHENTICATION

(71) Applicant: NCR Corporation, Duluth, GA (US)

(72) Inventor: Brian Steven Wotherspoon, Fife (GB)

(73) Assignee: NCR Corporation, Atlanta, GA (US)

( * ) Notice: Subject to any disclaimer, the term of this patent is extended or adjusted under 35 U.S.C. 154(b) by 315 days.

(21) Appl. No.: 15/791,625

(22) Filed: Oct. 24, 2017

(65) Prior Publication Data

US 2019/0121982 A1    Apr. 25, 2019

(51) Int. Cl.
| | | |
|---|---|---|
| *G06F 9/4401* | (2018.01) | |
| *G06F 21/57* | (2013.01) | |
| *G06Q 20/10* | (2012.01) | |
| *G06F 21/44* | (2013.01) | |

(52) U.S. Cl.
CPC ......... *G06F 21/575* (2013.01); *G06F 9/4401* (2013.01); *G06F 21/44* (2013.01); *G06Q 20/1085* (2013.01)

(58) Field of Classification Search
None
See application file for complete search history.

(56) References Cited

U.S. PATENT DOCUMENTS

| | | | | |
|---|---|---|---|---|
| 6,961,849 | B1* | 11/2005 | Davis ................. | G06F 21/6227 380/273 |
| 7,966,599 | B1* | 6/2011 | Malasky ................. | G06F 9/455 717/100 |
| 2011/0113241 | A1* | 5/2011 | Umezawa ............. | G06F 21/606 713/156 |
| 2014/0215196 | A1* | 7/2014 | Berlin ................... | G06F 21/575 713/2 |
| 2015/0317168 | A1* | 11/2015 | Chisholm .............. | G06F 9/441 713/2 |
| 2017/0237742 | A1* | 8/2017 | Salmela ................. | H04W 4/70 726/4 |

* cited by examiner

*Primary Examiner* — Paul Yen
(74) *Attorney, Agent, or Firm* — Schwegman, Lundberg & Woessner

(57) ABSTRACT

A Basic Input/Output System (BIOS)/Unified Extensible Firmware Interface (UEFI) on a Self-Service Terminal (SST) processes during a boot of the SST. When a new hard disk is detected as being present and an identifier for the new hard disk is missing from a whitelist, a signed hard disk identifier is verified from storage on the new hard disk. If the signed hard disk identifier is verified: the new hard disk is authenticated, the whitelist is updated to include the new hard disk identifier, a unique identifier for BIOS/UEFI and the new hard disk identifier are written to the storage of the new hard disk, and the boot process is permitted to continue for the SST.

18 Claims, 4 Drawing Sheets

BASIC INPUT/OUTPUT SYSTEM (BIOS)/UNIFIED EXTENSIBLE FIRMWARE INTERFACE (UEFI) HARD DRIVE AUTHENTICATION

BACKGROUND

Automated Teller Machines (ATM) are in general believed to be relatively secure devices since they handle consumer financial transactions and dispense currency. However, ATMs are susceptible to malware, viruses, and eavesdropping just like any other device having memory and processor capabilities.

One ATM resource that is particularly valuable to the ATM is the hard disk, which is relied upon during a boot process of the ATM to provide an authenticated version of the ATM's Operating System (OS).

Hard disks can be used for hiding malicious firmware, software, and/or a compromised OS. Yet, most ATM boots occur from the hard disk. A hard disk is an electromechanical physical device and components can and do fail over time; a hard disk may also lack storage capacity or lack acceptable access speed to support added functionality needed at the ATM.

As a result, hard disks do need replaced for ATMs, but replacing the hard disk poses substantial security risks.

SUMMARY

In various embodiments, methods and a Self-Service Terminal (SST) for BIOS authentication of an SST hard disk are presented.

According to an embodiment, a method for BIOS authentication of a hard disk is presented. Specifically, during a boot of a device, a peripheral is detected as being attached to the device. A signed identifier is obtained in a storage location of the peripheral. Then, a determination is made as to whether to finish boot processing for the boot based at least in part on verifying the signed identifier.

DETAILED DESCRIPTION

Figure 1:
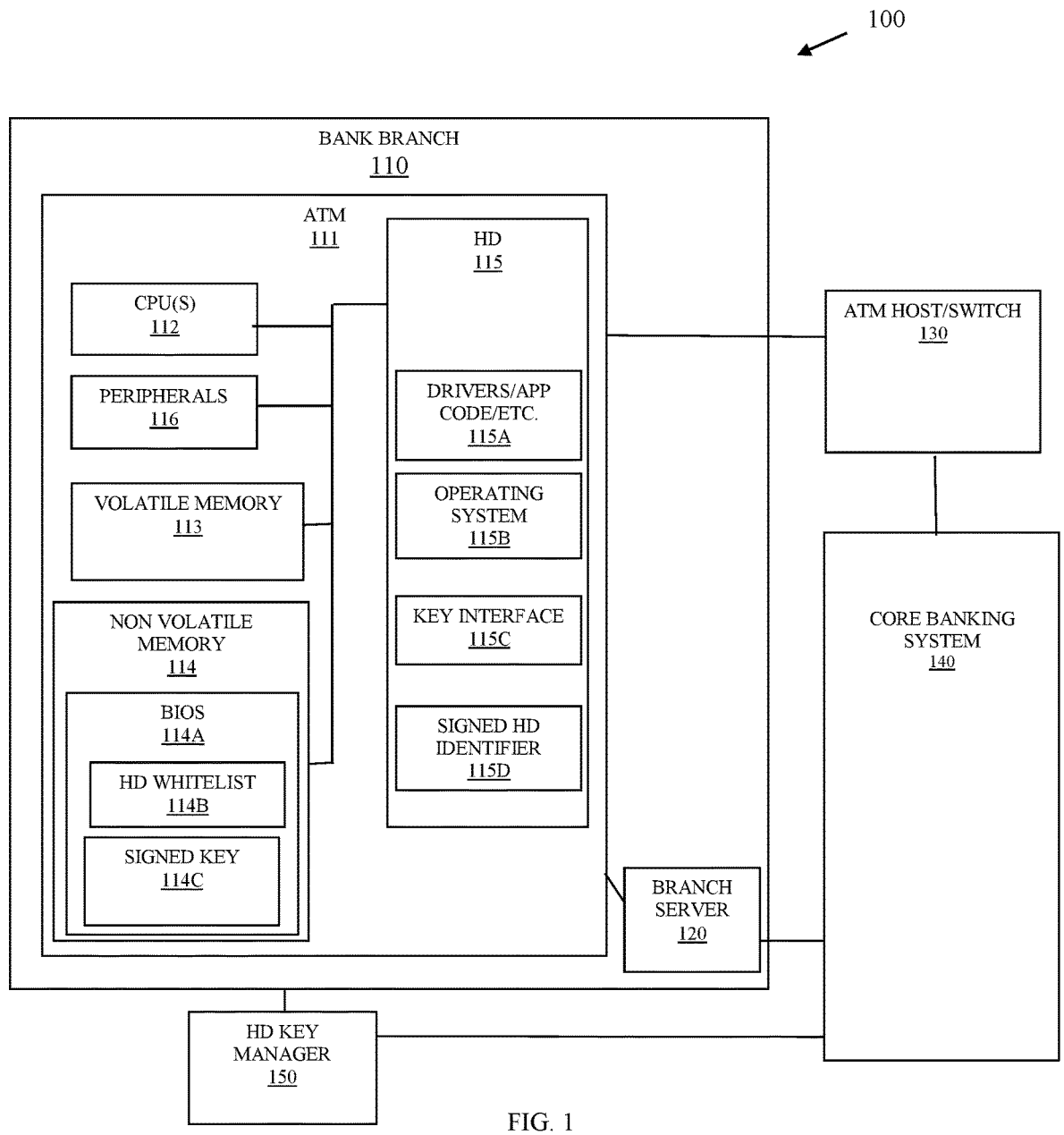
FIG. 1 is a diagram of a banking system for BIOS authentication of an ATM hard disk, according to an example embodiment.

FIG. 1 is a diagram of a banking system 100 for BIOS authentication of an ATM hard disk, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of BIOS authentication of a hard disk, presented herein and below.

It is to be noted that the FIG. 1 is presented and discussed with reference to a BIOS but BIOS can include a Unified Extensible Firmware Interface (UEFI) or any system firmware that performs boot processing of a computing device.

The banking system 100 includes a bank branch 110, an ATM host/switch 130, a core banking system 140, and hard disk (HD) key manager 150. The bank branch 110 includes: an ATM 111 and a branch server 120.

The ATM 111 includes one or more Central Processing Units (CPU(s) 112, volatile memory 113, non-volatile memory 114, a Hard Drive (HD) 115 (which may or may not be encrypted and dynamically decrypted as needed), and multiple peripheral devices (not shown in the FIG. 1). The non-volatile memory 114 includes new and novel BIOS 114A including a HD whitelist 114B, and a signed Key 114C. The HD 115 includes a variety of drivers/application code/etc. 115A, an operating system (OS) 115B, a key interface 115C, and a signed HD identifier 115D.

Initially, the BIOS 114A and he HD 115 is configured for performing the HD 115 authentication. During this initial configuration period, an operator of the branch server (administrator) obtains a branch 110 Public-Private Key Pair, registers the public key of the pair with the HD key manager 150, and stores a signed HD identifier 115D on the HD 115 with the private key portion of the pair. The HD Key manager 150 then signs the public key shared by the branch (with a private key of the HD key manager 150). The public key of the branch 110 that is signed with the private key of the HD key manager 150) is then made accessible to the BIOS 114A through the memory 114. The BOIS 114A is also configured for accessing a HD whitelist 114B through the memory 114. The whitelist 114B includes registered and known-authenticate HD identifiers for HDs that are check on each boot cycle of the ATM 111 for verification/authentication of those HDs.

This initial configuration can occur in a variety of manners. For example, an Application Programming Interface (API) or a web-based interface can be provided by the HD Key manager 150 for network access through the branch server 120. A request for a branch Public-Private Key Pair can be made and generated on behalf of the branch. Here, the HD key manager 150 already knows the branch's public key portion because the HD key manager 150 generated the pair of keys on behalf of the branch 110. In another case, the administrator of the branch 110 can access any open-sourced Public-Private Key Pair software to generate the key pair. The interface with the HD key manager 150 provides an entry field for the administrator to register the branch's public key with the HD key manager 150. Other approaches can be used as well, the point is that the branch 110 obtains a Public-Private Key pair and registers the public key with the HD key manager 150.

Continuing with example manners in which initial configuration processing can occur, the administrator of the branch may be provided instructions from the HD key manager 150 through the interface between the server 120 and the HD key manager 150 for obtaining the serial number from the HD 115 (which may be located on the packaging material for the HD 115 and/or printed or labeled on the HD 115. Existing software accessible to the branch server 120 or the interface to the HD key manager 150 can provide a mechanism for the administrator to enter the HD serial number (HD identifier) into an input field for signing by the branch's private key. The firmware associated with storing this signed HD identifier 115D may also be installed on the HD 115 through a key interface 115C. The HD 115 may come premanufactured with the key interface 115C or the interface between the branch server 120 can permit installation of the key interface 115C onto the HD 115 (such as by connecting the HD 115 to a port of the server 120 during a connection between the server 120 and the HD key manager 150).

A secure interface/procedure associated with the ATM 111 provides a mechanism for installing the signed (with the private key of the HD key manager 150) branch public key in memory 114 for access by the BIOS 114A. A customer engineer or technician can access this secure interface for initial installation of the signed (with the private key of the HD key manager 150) into the memory 114. This same initial installation of the BIOS 114 and the initial populated whitelist 114B can be used for storage in memory 114 of the ATM 111.

It is noted that other secure approaches may be used for initially configuring the novel BIOS 114A for authenticating a newly installed HD 115, the descriptions provided above are one of many possible initial configuration processing scenarios.

Once initial configuration of the memory 114 and BIOS 114A is completed, the ATM 111 can have the HDs replaced multiple times without having to perform the configuration processing discussed above (except for installing the signed (with the branch's private key) HD identifier 115D on the new HD 115, which is a configuration needed for each new HD 115 being installed on the ATM 111.

At this point, the branch personnel can connect the new HD 115 to the SATA cabling/ports within the ATM 111 and power the ATM 111 on, which loads and processes the instructions of the novel BIOS 114A.

The BIOS 114A receives a notification that the HD 115 is new and obtains the HD identifier with that notification or through firmware interaction with the HD 115. The BIOS 114A then checks for the new HD serial number in the HD whitelist 114B, since this is a new HD 115 the HD identifier (serial number) is missing from the whitelist 114. This causes the BIOS 114A to check for a signed key 114C that identifies the branch's public key as verified (through the signature) by the trusted HD key manager 150.

When the signed key 114C is detected, the BIOS 114A accesses firmware of the new HD 115 to obtain the signed HD identifier 115D. If this is not present the BIOS 114A will not load the OS 115B and will not permit the ATM 111 to continuing with the boot process. When the signed HD identifier 115D is present, the BOIS verifies the signature is associated with the branch 110 using the signed public key 114C. Again, if the signed HD identifier 115D is not authenticated/verified, the BIOS 114A does not permit the ATM 111 to continue with the boot process. When the signed HD identifier 115D is verified, the BOIS 114A ensures the HD identifier matches what it received from the HD 115 through the initial firmware interaction with the HD 115 (the boot processing is not permitted to proceed when there is not a match).

In an embodiment and assuming all verification has successfully been processed, the BIOS 114A adds the HD identifier to the HD whitelist 114. The BIOS 114A then adds a universally unique identifier (UUID) of the BIOS 114A to the HD identifier and stores that UUID-HD identifier pair on the HD 115 through the firmware of the HD 115. This ensures that the HD 115 cannot be reused with any other ATM 111 because the BIOS 114A also checks to ensure that its UUID is paired with the HD identifier during the boot process and when a different pair is returned from the HD 115, the boot processing is not permitted to proceed.

Should the ATM 111 be recommissioned to a different branch or decommissioned, the branch-specific signed public key 114C is wiped from the BIOS 114A.

This processing ensures that new HDs being installed on an ATM 111 can be done without physical visits and exchanging of passwords with the branch 110 and maintains a high degree of security when branch personnel perform routine HD 115 swaps on the ATM 111. The processing includes multiple levels of security through the BIOS 114A checking of whitelists 114B, verification of signed public keys 114C, verification of signed HD identifiers 115D, and paring of a specific BIOS 114A to a specific HD 115.

In an embodiment, the HD 115 is one of: a hard disk drive (HDD) and a solid state drive (SSD).

In an embodiment, the device that utilizes the BIOS HD authentication processing is any computer core device. In an embodiment, the device is a Self-Service Terminal (SST). In an embodiment, the SST is a kiosk.

In an embodiment, the HD key manager 150 is a service accessible to the branch 110 through the core banking system 140.

In an embodiment, the device that processes the HD key manager 150 is a server. In an embodiment, the server is part of a cloud processing environment.

In an embodiment, the novel processing of the BIOS 114A is provided in as a UEFI.

These and other embodiments will now be discussed with reference to the FIGS. 2-4.

Figure 2:
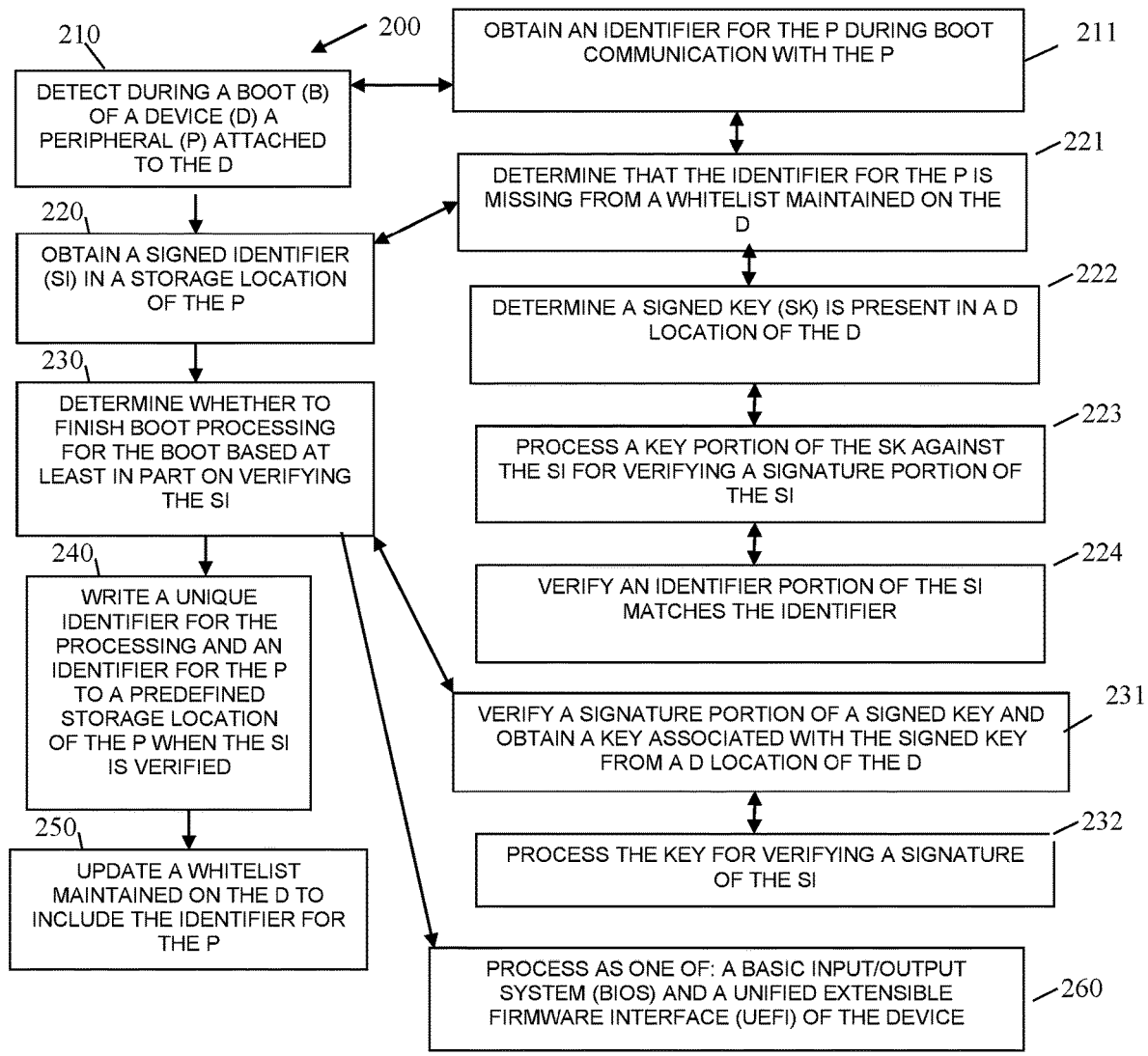
FIG. 2 is a diagram of a method for BIOS authentication of a hard disk, according to an example embodiment.

FIG. 2 is a diagram of a method 200 for BIOS authentication of a hard disk, according to an example embodiment. The software module(s) that implements the method 200 is referred to as a "HD authenticator." The HD authenticator is implemented as executable instructions programmed and residing within memory and/or a non-transitory computer-readable (processor-readable) storage medium and executed by one or more processors of a device. The processor(s) of the device that executes the HD authenticator are specifically configured and programmed to process the HD authenticator. The HD authenticator may have access to one or more network connections during its processing. The network connections can be wired, wireless, or a combination of wired and wireless. In an embodiment, the HD authenticator does not require or does not have any network connectivity during its processing.

In an embodiment, the device that executes the HD authenticator is the ATM 111.

In an embodiment, the device that executes the HD authenticator is a SST. In an embodiment, the SST is a kiosk.

In an embodiment, the device that executes the HD authenticator is a SST that is capable of operating in a Point-Of-Sale (POS) mode of operation where a clerk assists a customer with a transaction.

In an embodiment, the HD authenticator is the BIOS 114A.

In an embodiment, the HD authenticator is an UEFI.

In an embodiment, the HD authenticator is implemented within or as an enhancement to a BIOS or an UEFI.

At 210, the HD authenticator detects during a boot of the device that executes the HD authenticator a peripheral attached to the device. Peripherals are identified during boot and identifiers for the peripherals are acquired. In an embodiment, the peripheral is one of a HDD or a SSD.

In an embodiment, at 211, the HD authenticator obtains an identifier for the peripheral during the boot communication with the peripheral. That is, the firmware interface of the peripheral provides identification to the BIOS/UEFI (which is enhanced with the HD authenticator) of its identifier.

At 220, the HD authenticator obtains a signed identifier in a storage location of the peripheral. The HD authenticator uses a firmware interface of the peripheral to retrieve the signed identifier. In an embodiment, the signed identifier is in a predefined and pre-established physical location within the peripheral and the HD authenticator uses the peripheral firmware interface to retrieve the contents of that predefined location, which includes the signed identifier. This is the identifier of the peripheral that is part of the configuration processing discussed above with the FIG. 1, the identifier is signed by a private key of the branch (enterprise).

In an embodiment of 211 and 220, at 221, the HD authenticator determines that the identifier for the peripheral (obtained at 211 through the firmware interface at a predefined storage location of the peripheral) is missing from a whitelist of authorized peripheral devices. The HD authenticator maintains the whitelist having authorized peripheral identifiers) on the device that is being booted by the HD authenticator. Typically, if the peripheral identifier is missing from a whitelist boot processing would not complete and the boot would fail; this is not the case here with the processing of the HD authenticator occurring during the boot of the device.

It is also to be noted that in cases where the identifier is present in the whitelist, the peripheral has been previously authenticated and boot processing can continue for booting the device. This can be the situation when the peripheral was previously attached to the device being booted and the HD authenticator already processed and updated the peripheral identifier to the whitelist.

In an embodiment of 221 and at 222, the HD authenticator determines that a signed key is present in a device location of the device that is being boot and for which the HD authenticator is processing the boot. This signed key is the public key of the branch (enterprise) that was signed as being authenticate by the HD key manager 150 as discussed above with the system 100. The signature of this signed key is also validated by the HD authenticator to ensure that the key was signed by the HD key manager 150. It is noted that if there is no signed key present on the device being booted than the boot process stops and the device is not permitted to finish the boot processing.

In an embodiment of 222 and at 223, the HD authenticator processes a key portion of the signed key against the signed identifier for verifying a signature portion of the signed identifier. That is, the key obtained at 221 is used to validate the signature of signed identifier that was retrieved from a predefined storage location within the peripheral by the HD authenticator.

In an embodiment of 223 and at 224, the HD authenticator verifies an identifier portion of the signed identifier matches the identifier obtained through the firmware interface back at 211. This provides an added level of security because it is possible that the branch (enterprise) added a different peripheral identifier accidentally to the peripheral in the manners discussed above with the FIG. 1. So, the HD authenticator makes sure that the proper peripheral identifier was signed and stored in the predefined peripheral storage location. If no match occurs on the identifier portion from the peripheral location to the identifier returned by the firmware interface of the peripheral, the HD authenticator does not allow boot processing to continue and the device does not boot successfully with the attached peripheral.

It is noted that if any of the signatures (for the signed key located in device being booted and for the signed identifier located in a peripheral storage location of the peripheral) are not verified, the HD authenticator does not permit boot processing to continue and does not allow the device to successfully boot up.

At 230, the HD authenticator determines whether to finish boot processing for the boot of the device based, at least in part, on verifying the signed identifier retrieved from the peripheral storage location on the peripheral.

According to an embodiment, at 240, the HD authenticator writes or stores a unique identifier for the HD authenticator and an identifier for the peripheral to a predefined storage location on the peripheral when the peripheral is verified/authenticated at 230. This creates a pairing between the peripheral and the executing instance of the HD authenticator. Other BIOS/UEFI processing can check for this pairing during boots (the HD authenticator can as well) and when present if the pairing does not match for an instance of the HD authenticator boot processing fails. This ensures that the peripheral is linked and commissioned for use with just the specific device that processes the instance of the HD authenticator (which adds even more security for authentication of peripheral devices being attached to the device.

In an embodiment of 240 and at 250, the HD authenticator updates a whitelist maintained on the device to include the identifier for the peripheral. This means during a next boot iteration of the device, the HD authenticator will detect the peripheral identifier in the whitelist and can more rapidly authenticate the peripheral without performing some of the processing discussed above.

In an embodiment, at 260, the HD authenticator processes on the device as a modified and enhanced BIOS or UEFI.

Figure 3:
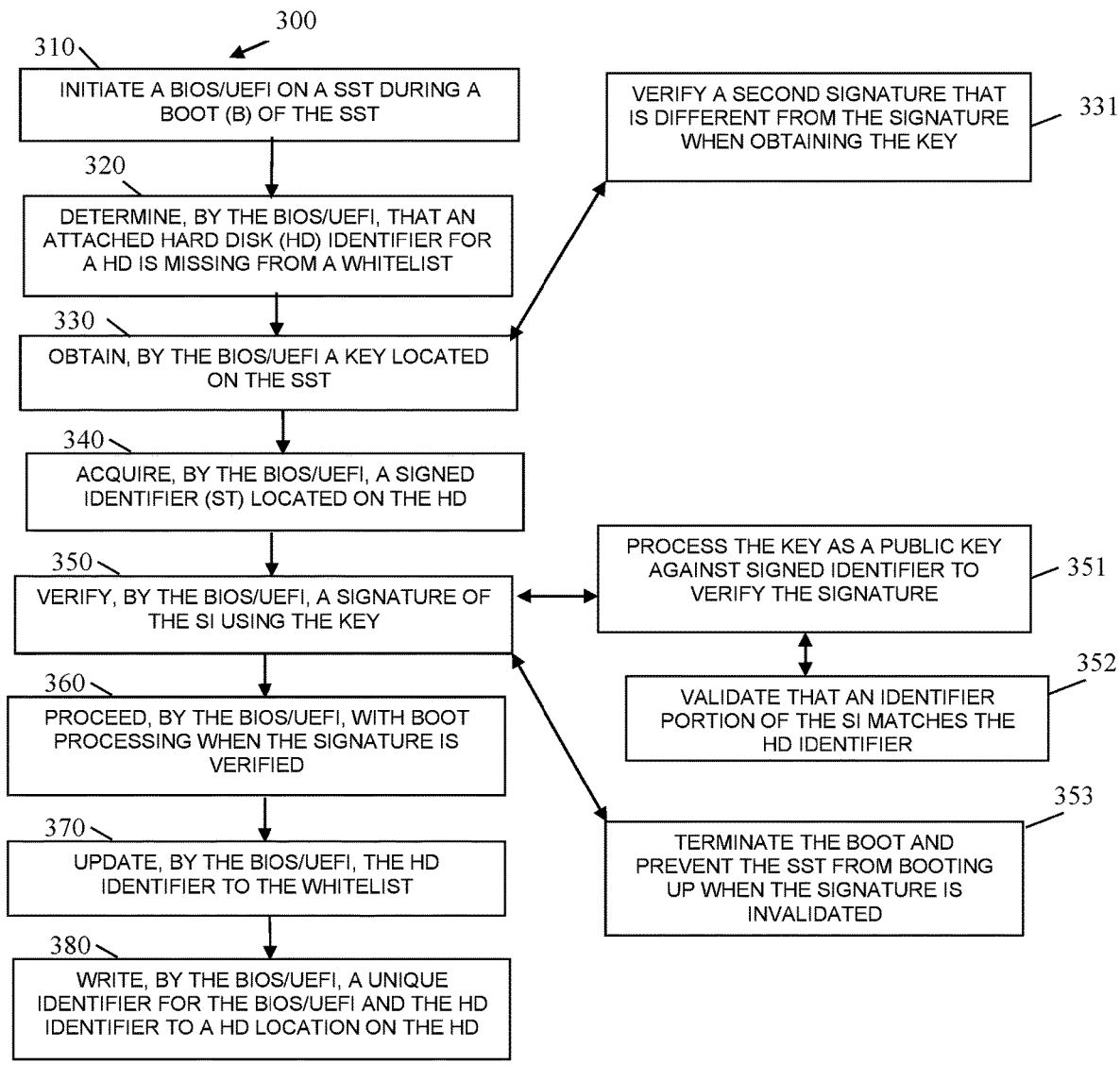
FIG. 3 is a diagram of another method for BIOS authentication of a hard disk, according to an example embodiment.

FIG. 3 is a diagram of another method 300 for BIOS authentication of a hard disk, according to an example embodiment. The software module(s) that implements the method 300 is referred to as a "boot manager." The boot manager is implemented as executable instructions programmed and residing within memory and/or a non-transitory computer-readable (processor-readable) storage medium and executed by one or more processors of a device. The processors that execute the boot manager are specifically configured and programmed to process the boot manager. The boot manager has access to one or more network connections during its processing. The network connections can be wired, wireless, or a combination of wired and wireless. In an embodiment, the boot manager does not require or does not have any network connection or access to a network during processing.

In an embodiment, the device that executes the boot manager is an SST. In an embodiment, the SST is the ATM 111 of the FIG. 1. In an embodiment, the SST is a kiosk.

In an embodiment, the device that executes t boot manager is a SST capable of operating in a POS mode of operation.

In an embodiment, the boot manager is all or some combination of: the BIOS 114A and/or the method 200.

In an embodiment, the boot manager is a UEFI.

In an embodiment, the boot manager is implemented as an enhancement to a BIOS and/or a UEFI.

The boot manager provides another and in some manners enhanced processing perspective from that which was described above with the FIGS. 1 and 2.

At 310, the boot manager initiates a BIOS/UEFI on a SST during a boot of the SST.

At 320, the BIOS/UEFI, determines that an attached HD identifier for a HD is missing from a whitelist. It is noted that when the HD identifier is present in the whitelist, the attached HD is considered authenticated for the boot of the SST.

At 330, the BIOS/UEFI obtains a key located on the SST. Again, when the key is not present the boot processing stops and the SST is not permitted to successfully boot.

According to an embodiment, at 331, the BIOS/UEFI verifies a second signature for the key (the key is signed and the second signature is different from a first signature discussed below at 350) when the key is obtained from the SST. This signature for the signed key is for the HD key manager 150 as discussed above with the discussion of the FIG. 1. If the signature for the signed key is invalid (not validated), then the BIOS/UEFI does not permit boot processing to continue for the SST.

At 340, the BIOS/UEFI acquires a signed identifier that is located in a HD storage location of the HD. Again, if the BIOS/UEFI is unable to obtain the signed identifier from the HD storage location of the HD, the BIOS/UEFI does not permit the boot to proceed.

At 350, the BIOS/UEFI verifies a first signature of the signed identifier by processing the key obtained at 330. That is, the branch uses a branch private key to sign the identifier for the HD and stores that signed identifier on the HD storage location. The key is the branch's shared public key, the public key is processed to verify the signature of the signed identifier, as was discussed above with the FIG. 1.

According to an embodiment, at 351, the BIOS/UEFI processes the key as a public key against the signed identifier to verify the signature (as discussed above).

In an embodiment of 351 and at 352, the BIOS/UEFI validates that an identifier portion of the signed identifier matches the HD identifier that was obtained by the BIOS/UEFI for the processing at 320. The BIOS/UEFI acquires the HD identifier through a firmware interface to the HD.

In an embodiment, at 353, the BIOS/UEFI terminates the boot and prevents the SST from booting up when the signature is invalidated.

At 360, the BIOS/UEFI proceeds with remaining boot processing when the signature is verified at 360 for booting the SST for operation.

According to an embodiment, at 370, the BIOS/UEFI updates the HD identifier to the whitelist.

In an embodiment, of 370 and at 380, the BIOS/UEFI writes a unique instance identifier for the BIOS/UEFI and the HD identifier to a predefined HD location on the HD using the HD's firmware interface. This creates a pairing, such that the HD is only identified as being authenticated for the specific SST having the specific instance of the BIOS/UEFI.

Figure 4:
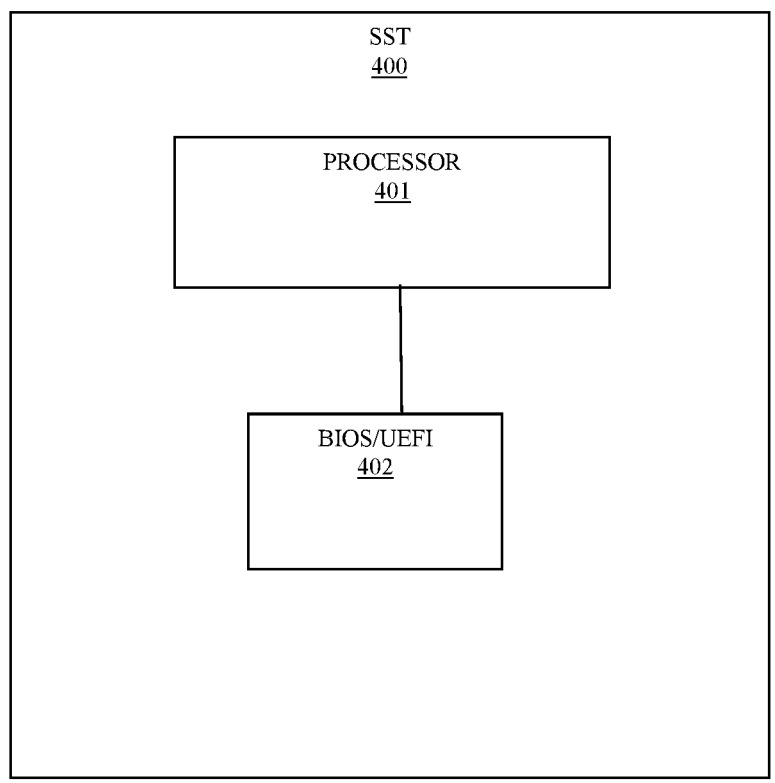
FIG. 4 is a diagram of a Self-Service Terminal (SST), according to an example embodiment.

FIG. 4 is a diagram of a Self-Service Terminal (SST) 400, according to an example embodiment. The SST 400 includes a variety of hardware components and software components. The software components of the SST 400 are programmed and reside within memory and/or a non-transitory computer-readable medium and execute on one or more processors of the SST 400. The SST 400 may communicate over one or more networks, which can be wired, wireless, or a combination of wired and wireless.

In an embodiment, the SST 400 lacks any network connectivity during one mode of operation where the SST 400 is being booted or at least lacks any network connectivity during the boot process (pre-boot).

In an embodiment, the SST 400 is the ATM 111.

In an embodiment, the SST 400 is a kiosk.

In an embodiment, the SST 400 is a SST capable of operating as a POS terminal.

The SST 400 includes a processor 401 and a BIOS/UEFI 402.

The BIOS/UEFI 402 is adapted and configured to: execute on the hardware processor 401 when the SST 400 is booted during the boot processing. The BIOS/UEFI 402 is configured and adapted to: i) detect an identifier for a HD attached to the SST 400, ii) attempt to match the identifier to other identifiers in a whitelist located on the SST 400, iii) obtain a key located on the SST 400 when the identifier is missing in the whitelist, iv) verify a signed identifier located on the hard disk when the key is obtained, and v) permit the boot to continue for staring up the SST when the signed identifier is verified.

It is noted that the BIOS/UEFI 402 prevents booting of the SST 400 and terminates boot processing for any condition that indicates: the SST 400 is missing the key, a signature for the key is invalid, the HD is missing a signed identifier, a signature from the signed identifier is invalid when using the key, or the HD identifier obtained from the HD during first communication with the SST during the boot does not match the identifier portion of the signed identifier.

It is also noted that the BIOS/UEFI 402 updates the whitelist to include the identifier of the HD when the boot proceeds and the HD is authenticated to the SST 400. This means that on a next and all subsequent boots of the SST 400 the BIOS/UEFI 402 will find the identifier in the whitelist and authenticate the HD for communication with the SST.

In an embodiment, the BIOS/UEFI 402 is further configured when the HD is authenticated for use by the SST 400 to write or store a unique instance identifier for the BIOS/UEFI 402 and the HD identifier to a predefined storage location on the HD. This creates the pairing between the SST 400, the BIOS/UEFI 402, and the HD, so that the HD is not re-authenticated subsequently with a different SST 400 for use.

In an embodiment, the boot HD authenticator 402 is all or some combination of: the BIOS 114A, the BIOS 114, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting, during a boot of a device, a Hard Disk Drive (HDD) or a Solid State Drive (SSD) attached to the device;
   obtaining a signed identifier in a storage location of the HDD or the SSD;
   determining whether to finish boot processing for the boot based at least in part on verifying the signed identifier;
   writing a universally unique identifier (UUID) for a Basic Input/Output System (BIOS) or a Unified Extensible Firmware Interface (UEFI) that represents an executing instance of the method and an identifier for the HDD or the SSD as a UUID-HDD/SSD identifier pair on the HDD or the SSD when the signed identifier is verified; and
   verifying, during a subsequent boot of the device, that the UUID-HDD/SSD identifier pair obtained from the HDD or the SSD matches the UUID for the BIOS or the UEFI and the identifier for the HDD or the SSD ensuring the HDD or the SSD is paired with the BIOS or the UEFI before permitting the subsequent boot of the device to process.

2. The method of claim 1 further comprising, updating a whitelist maintained on the device to include the identifier for the HDD or the SSD.

3. The method of claim 1, wherein detecting further includes obtaining an identifier for the HDD or the SSD during boot communication with the peripheral.

4. The method of claim 3, wherein obtaining further includes determining that the identifier for the HDD or the SSD is missing from a whitelist maintained on the device.

5. The method of claim 4, wherein determining further includes determining a signed key is present in a device location of the device.

6. The method of claim 5, wherein determining further includes processing a key portion of the signed key against the signed identifier for verifying a signature portion of the signed identifier.

7. The method of claim 6, wherein processing further includes verifying an identifier portion of the signed identifier matches the identifier.

8. The method of claim 1, wherein determining further includes verifying a signature portion of a signed key and obtaining a key associated with the signed key from a device location of the device.

9. The method of claim 8, wherein verifying further includes processing the key for verifying a signature of the signed identifier.

10. The method of claim 1 further comprising, processing the method as one of: a Basic Input/Output System (BIOS) and a Unified Extensible Firmware Interface (UEFI) of the device.

11. A method, comprising:
    initiating a Basic Input/Output System (BIOS)/Unified Extensible Firmware Interface (UEFI) on a Self-Service Terminal (SST) during a boot of the SST;
    determining, by the BIOS/UEFI, that a hard disk identifier for an attached hard disk is missing from a whitelist;
    obtaining, by the BIOS/UEFI, a key located on the SST;
    acquiring, by the BIOS/UEFI, a signed identifier located on the hard disk;
    verifying, by the BIOS/UEFI, a signature of the signed identifier using the key;
    proceeding, by the BIOS/UEFI, with boot processing of SST when the signature is verified;
    writing, by the BIOS/UEFI, a universally unique identifier (UUID) for the BIOS/UEFI and the hard disk identifier for the hard disk as a UUID-hard disk identifier pair to a hard disk location on the hard disk; and
    verifying, during a subsequent boot of the SST, that the UUID-hard disk identifier pair obtained from the hard disk location matches the UUID for the BIOS/UEFI and the hard disk identifier for the hard disk ensuring the hard disk is paired with the BIOS/UEFI before permitting the subsequent boot of the SST to process.

12. The method of claim 11 further comprising, updating, by the BIOS/UEFI, the whitelist to include the hard disk identifier.

13. The method of claim 11, wherein obtaining further includes verifying a second signature that is different from the signature when obtaining the key.

14. The method of claim 11, wherein verifying further includes processing the key as a public key against the signed identifier to verify the signature.

15. The method of claim 14, wherein processing further includes validating that an identifier portion of the signed identifier matches the hard disk identifier.

16. The method of claim 11, wherein verifying further includes terminating the boot and preventing the SST from booting up when the signature is invalidated.

17. A Self-Service Terminal (SST), comprising:
    a processor; and
    a Basic Input/Output System (BIOS)/Unified Extensible Firmware Interface (UEFI) executed by the processor on a boot of the SST;
    wherein the BIOS/UEFI is configured to: i) detect an identifier for a hard disk attached to the SST, ii) attempt to match the identifier to other identifiers in a whitelist located on the SST, iii) obtain a key located on the SST when the identifier is missing in the whitelist, iv) verify a signed identifier located on the hard disk when the key is obtained, v) permit the boot to continue for starting up the SST when the signed identifier is verified; vi) write a universally unique identifier (UUID) for the BIOS/UEFI and the identifier for the hard disk as a UUID-hard disk identifier pair to a hard disk location on the hard disk; and vii) verify, during a subsequent boot of the SST, that the UUID-hard disk identifier pair obtained from the hard disk location matches the UUID for the BIOS/UEFI and the identifier for the hard disk to ensure that the hard disk is paired with the BIOS/UEFI before permitting the subsequent boot of the SST to process.

18. The SST of claim 17, wherein the SST is an ATM.

* * * * *